(12) United States Patent
Zorzo (10) Patent No.: US 9,955,843 B2
(45) Date of Patent: May 1, 2018

(54) VALVE BODY OF A DOSING DEVICE

(71) Applicant: Renato Zorzo, Onara (IT)

(72) Inventor: Renato Zorzo, Onara (IT)

(73) Assignee: TTS Cleaning s.r.l., S. Giustina in Colle (IT)

( * ) Notice: Subject to any disclaimer, the term of this patent is extended or adjusted under 35 U.S.C. 154(b) by 70 days.

(21) Appl. No.: 14/769,662

(22) PCT Filed: Feb. 24, 2014

(86) PCT No.: PCT/IB2014/059205
§ 371 (c)(1),
(2) Date: Aug. 21, 2015

(87) PCT Pub. No.: WO2014/128670
PCT Pub. Date: Aug. 28, 2014

(65) Prior Publication Data
US 2016/0015237 A1   Jan. 21, 2016

(30) Foreign Application Priority Data

Feb. 25, 2013   (IT) .............................. PD2013A0041

(51) Int. Cl.
*A47L 13/50* (2006.01)
*F16K 31/528* (2006.01)
*B67D 3/00* (2006.01)
*G01F 11/32* (2006.01)

(52) U.S. Cl.
CPC ............ *A47L 13/50* (2013.01); *B67D 3/0045* (2013.01); *F16K 31/528* (2013.01); *G01F 11/32* (2013.01)

(58) Field of Classification Search
CPC ....... A47L 13/50; B67D 3/0045; G01F 11/32; F16K 31/528
See application file for complete search history.

(56) References Cited

U.S. PATENT DOCUMENTS

| | | | | |
|---|---|---|---|---|
| 4,660,742 A | * | 4/1987 | Ozdemir | B67D 1/12 222/153.09 |
| 9,423,285 B2 | * | 8/2016 | Barton | A61J 1/1418 |
| 2005/0263547 A1 | * | 12/2005 | Jensen et al. | B67D 3/0045 222/504 |

* cited by examiner

*Primary Examiner* — Kevin Lee
(74) *Attorney, Agent, or Firm* — Quickpatents, LLC; Kevin Prince (57) ABSTRACT

The object of this invention is a valve body of a cleaning appliance, specifically a dosing device, whose valve body can open and close the inlet and outlet pipes of the dosing chamber of the dosing device, to release a correct amount of detergent for soaking a cleaning cloth.

12 Claims, 11 Drawing Sheets

VALVE BODY OF A DOSING DEVICE

CROSS-REFERENCE TO RELATED APPLICATIONS

This application claims the benefit of PCT Patent Application PCT/IB2014/059205, filed on Feb. 14, 2014 and Italian Patent Application PD2013/A000041, filed on Feb. 25, 2013, both incorporated herein by reference.

STATEMENT REGARDING FEDERALLY SPONSORED RESEARCH AND DEVELOPMENT

Not Applicable.

FIELD OF THE INVENTION

The field of application of the invention concerns a valve body of a cleaning appliance, specifically a dosing device, whose valve body can open and close the inlet and outlet pipes of the dosing chamber of said dosing device, to release the right amount of detergent for soaking a cleaning cloth.

DISCUSSION OF RELATED ART

It is well known that all appliances in the professional sector have to meet higher levels of quality than those to be used in a domestic setting.

This quality level refers both to the construction material as well as to the relative design, so that said appliances are durable and easy to use, in order to facilitate the continuous operations of a sector operator, and furthermore that said equipment can use and consume just the amount of detergent that is strictly necessary for cleaning requirements.

Another important aspect of such appliances is that when needed they can be quickly restored to their full functionality following a simple and practical maintenance operation.

It is very clear that said maintenance operations, which often concern the parts that are subject to wear, are carried out not by cleaning personnel but by specific personnel specialised in maintenance and reconditioning.

This service, which is very often entrusted to outside companies, is important and crucial for establishing how successful an article is commercially.

Bearing this in mind, one of the aspects that increasingly characterises professional cleaning is the end quality carried out with the minimum, but at the same time correct, amount of detergent.

One piece of equipment that allows you to carry out the above-mentioned objectives is concretised in a calibrated dosing device for cleaning detergents.

Indeed, a detergent dosing device has the aim of releasing an exact amount of liquid detergent into a specific soaking basin, inside which a cleaning cloth is then placed.

It is very clear that both the dilution of the chemical concentrate, as well as the amount of detergent to be released are fixed previously according to requirements, like for example the type of cloth used and the type of floor to be cleaned and the dirt to be treated.

In the past there have been attempts to pursue these aims with equipment that in many ways have proven to be unsatisfactory.

In fact, the complexity and poor versatility of the current detergent dosing devices is well known, which include a top tank that is joined to a dosing chamber underneath, inside which there is a valve operated by actuating devices controlled by the operator, to release the liquid stored inside the chamber itself, into a basin underneath.

An example of such devices is shown in U.S. Pat. No. 4,174,977.

Later, by adopting a dosing device with a variable volume of the type shown in DE3724849, the volume of the dosing chamber was rendered variable, to release a pre-set amount of liquid.

One of these dosing devices, with a variable volume chamber of the type shown in DE3724849, and of the same type shown in U.S. Pat. No. 4,174,977, but with a complicated, intricate valve, is shown in EP1736091.

In fact the valve used in the device shown in EP1736091 is composed of numerous moving parts connected together with numerous springs: and all within the dosing chamber and constantly dampened by the detergent.

These and other examples of previous dosing devices for releasing a pre-set amount of detergent, have proven to be poorly accepted by professional operators because of their inherent drawbacks.

One of the main drawbacks of current dosing devices concerns the difficult maintenance and the replacement of worn parts, with lengthy periods of time required for carrying out the above-mentioned operations.

Moreover, these very dosing devices have evident operational difficulty, because the operator has to, with each change of the detergent, go to a specific area and discharge/empty out all the detergent, even that in the tank, in order to then fill the tank and use a fresh and different type of detergent.

Another negative aspect concerns the impossibility of inspecting and checking the valve component in the dosing chamber.

In fact, generally this valve component is made from the assembly of various moving parts united in a chamber that is constantly dampened by the detergent, and therefore subject to a premature loss of functionality, both regarding the seal as well as the precision operations.

In fact, it is well known that the continual wetting-drying of a moving part immersed in a detergent leads to the stratification of continual and superimposed films that create encrustations limiting/impeding the free operation of the above-mentioned moving parts.

This loss of functionality renders the device unusable because of the continuous and undesired dripping.

SUMMARY OF THE INVENTION

The object of this invention is to overcome one or more of the drawbacks of the prior art.

Another object of this invention is to make available a valve body of a dosing device that is always reliable.

A further object is to make available a valve body of a dosing device that is easy to construct.

An even further object is to make available a valve body of a dosing device that is easy to maintain.

Another object is to make available a valve body of a dosing device that is easy to adjust, both regarding the travel of the stroke as well as regarding the closure of the inlet and outlet conduits of the dosing chamber.

A further object of this invention is to make available a valve body of a dosing device that is reliable over time and whose moving parts are secure.

Another object of this invention is to make available a valve body of a dosing device that can be visibly inspected.

Another object of this invention is to make available a valve body of a dosing device that facilitates the operations for changing the type of detergent, making them quick and simple.

Technical Solution

All the above-mentioned aims are realised by a valve body of a dosing device, which has a hollow body of the device for storing and holding a pre-determined amount of a cleaning liquid, where said valve body is composed of a first valve body element and a second valve body element, and moreover said valve body is inserted inside hollow body of the same device for dosing liquid detergent, for the opening and closing of the inlet pipe and outlet pipe, respectively for supplying and emptying the detergent inside the hollow body, where said valve body can move in a sliding manner between two pre-set positions following the operation of the actuating devices, to a first position opening the inlet and the closing of the outlet, and a second position of closing the inlet and opening the outlet, and where said valve body has, near the opposite ends, profiles that join to the relative seals for closing the inlet and outlet pipes, and with the closing profile of the outlet pipe located on the outside of the hollow body since the lower part of the first element of valve body for the closing of the lower pipe, is always exposed outside the hollow body, and the part of the valve body to which the seal is connected for closing the lower pipe, with the lower part of the first element of the valve body protruding partly on the outside of the hollow body, shows the seal for sealing closed the outlet pipe.

Advantageous Effects

Advantageously the seal for closing the outlet pipe is, during closing, subject to the pressure of the lower part of the first element of the valve body that pushes from the outside of the hollow body.

Advantageously the seal for closing the outlet pipe is on the closing edge of the outlet pipe.

Advantageously said first element of the valve body can be extracted from within the hollow body through the outlet pipe for its maintenance and/or its replacement.

Advantageously at least one of said seals is joined solidly to the upper and/or lower element of the valve body, remaining exposed and protruding during at least one of the pre-set positions so that it can be easily replaced.

Alternatively to the advantage previously set out, at least one of said seals is connected solidly to the mouth of the opening of the inlet pipe and/or outlet pipe, held inside a specific housing, remaining securely sheltered when the device is operating.

Said first lower element and said second upper element connect, supporting directly or entering into contact following the movement with the relative seals for closing the outlet and inlet pipes; in both modes of installing the seals, because of their arrangement, the inspection and maintenance of the seals are considerably simplified, since the seal on top of the second element is near the inlet mouth and the seal below the first element is near the outlet mouth.

Advantageously said first and said second element of the valve body are connected to each other, avoiding the need for any moving parts that in the long terms could create the same problems of movement and lack of guaranteed closing reliability of the prior art.

Opportunely, in a second variant for operating said valve body it is composed of two elements joined together, eventually in an adjustable manner; since the two elements can be easily extracted and removed from the hollow body through the same inlet and outlet openings for eventual cleaning and/or replacement of the elements themselves or their seals.

Opportunely each of the two elements making up the valve body, a first lower valve body element and a second upper valve body element, has independent elastic devices for closing and/or opening the respective inlet and outlet pipes.

Advantageously said second element of the valve body for opening and closing the inlet pipe of the hollow body can be removed from inside the hollow body through the inlet pipe for its maintenance and/or its replacement.

Opportunely said second upper element of the valve body is connected in a moving way to the hollow body.

Very advantageously said second element of the valve body is connected in a movable manner to a removable tank above the hollow body of the dosing device.

Advantageously said second element opens the inlet pipe of the hollow body following a push from the upper end of the first element of the valve body.

Advantageously said second upper element can take up again its inlet closing position brought about by independent elastic devices that act on the upper element of the valve body; guaranteeing in any circumstance a secure closing against the liquid in the tank coming out, in the absence of an efficient push of the underlying lower element of the valve body.

Advantageously said first and said second element of the valve body are axially overlapping, in itself an excellent design decision, that of the movement of the various parts subject to unidirectional operating forces.

Opportunely, said second upper element of the valve body is solidly connected to a removable tank on top of the hollow body of the dosing device, allowing for the removal and replacement with an identical tank for changing the detergent or increasing autonomy.

DESCRIPTION OF THE DRAWINGS

The technical characteristics of the valve body of the dosing device, according to the various actuation modes but always according to the same invention, for the above-mentioned objectives, can be clearly observed in the claims below, and its benefits will be clearer in the detailed description that follows, made with reference to the attached diagrams, which represent an example of some ways it could be made, and so should not be considered in any way limiting, where:

DETAILED DESCRIPTION OF THE PREFERRED EMBODIMENT

Figure 1:
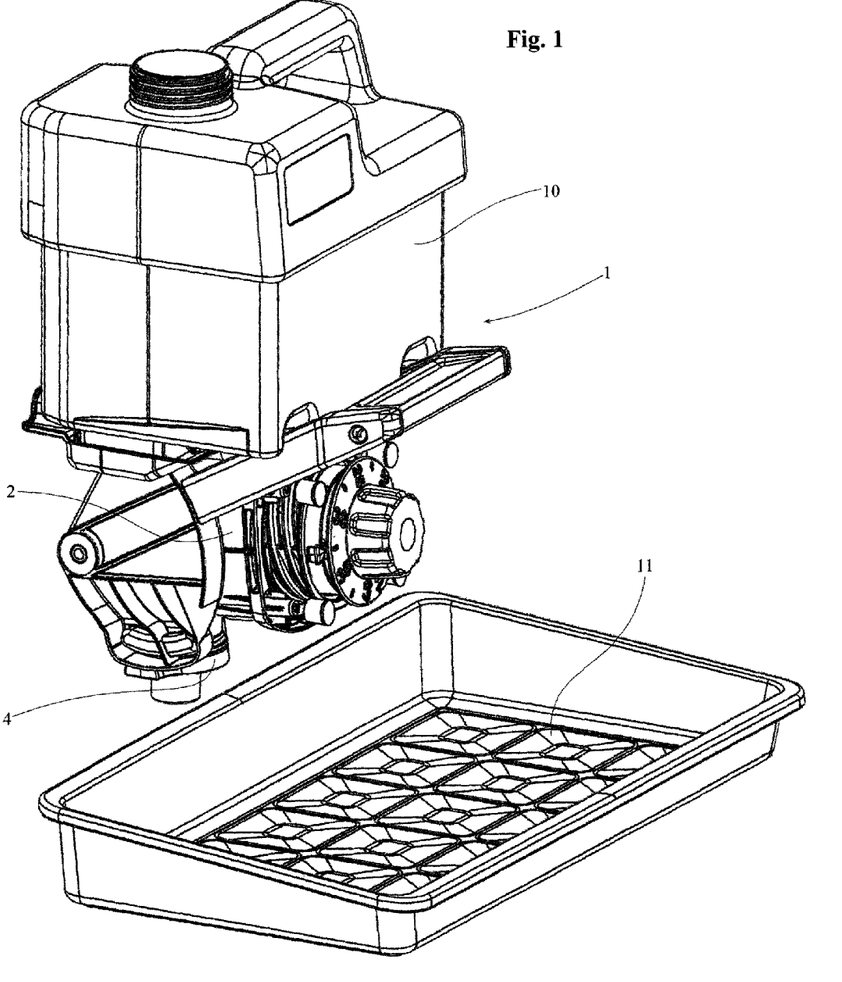
FIG. 1 shows a perspective view of a dosing device accessorised on the top with a tank and on the bottom with a soaking basin.
Figure 2:
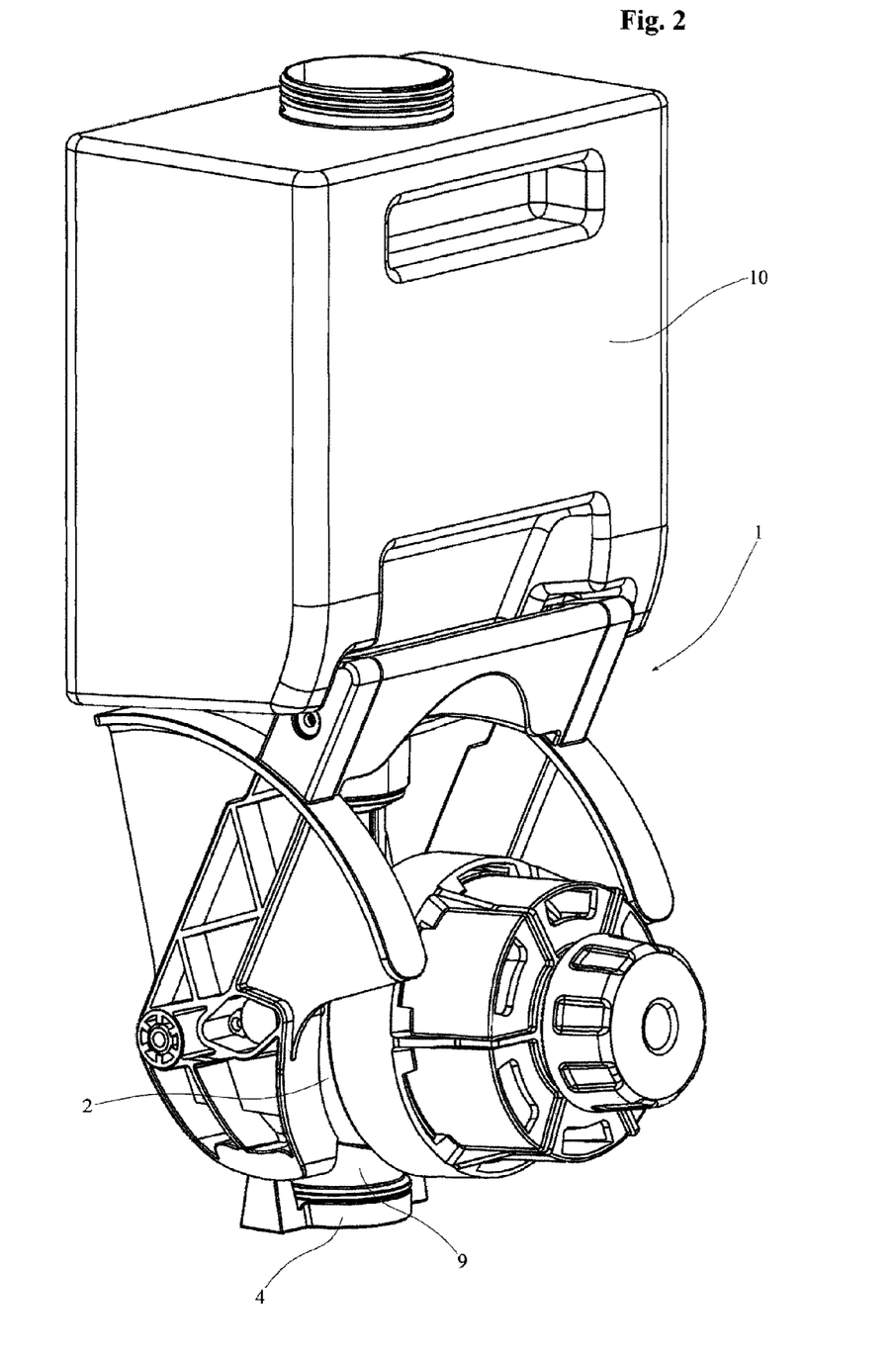
FIG. 2 shows a perspective view of the dosing device that is the object of this invention.
Figure 3:
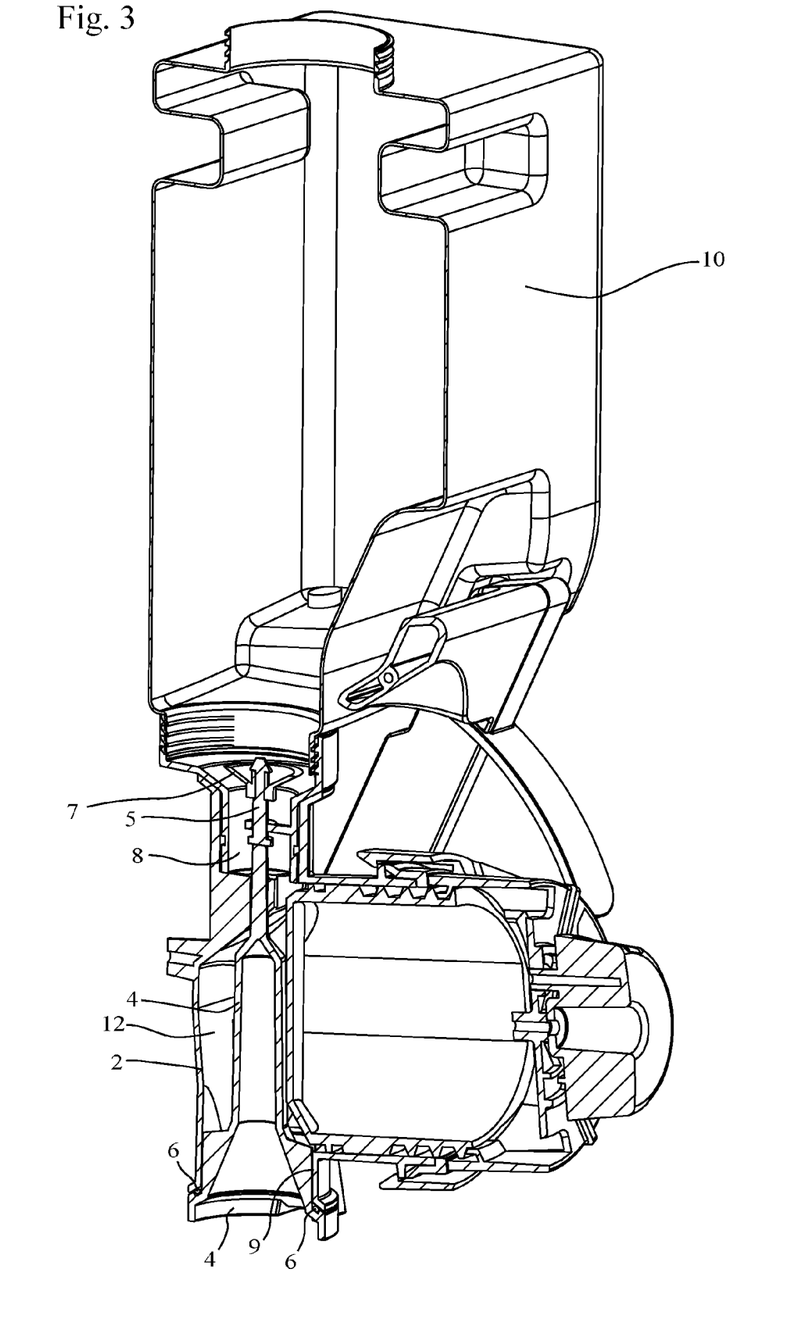
FIG. 3 shows a vertical cross-section perspective view of the device of FIG. 2 passing through the axis of the valve body.
Figure 4:
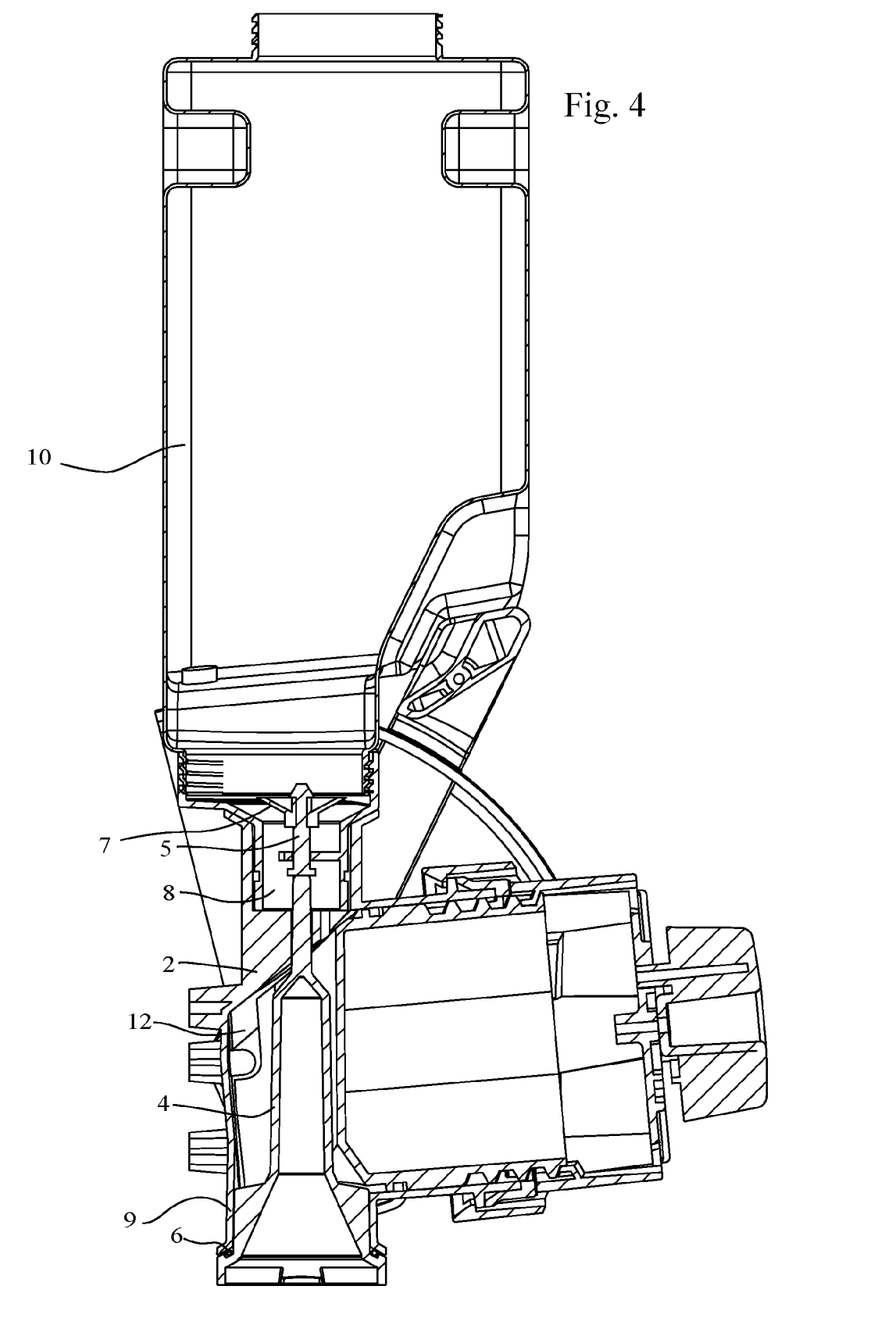
FIG. 4 shows a plan view of the device of FIG. 3.
Figure 5:
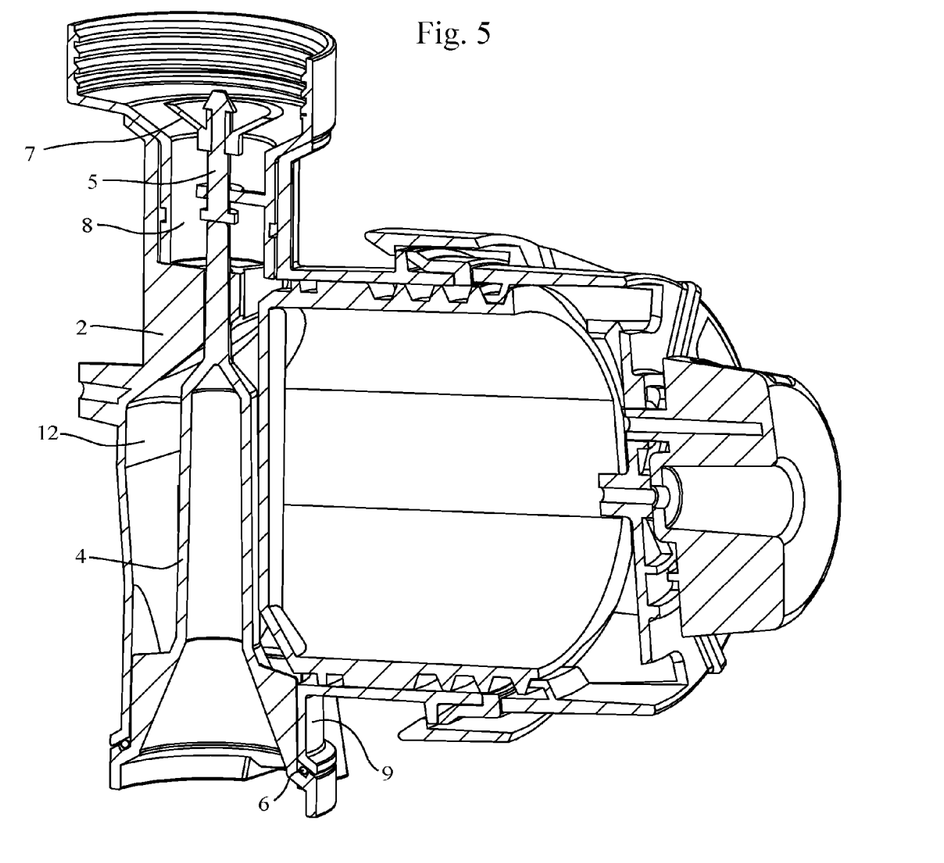
FIG. 5 shows an enlarged view of the object of FIG. 3 without the top tank and without any moving parts.
Figure 6:
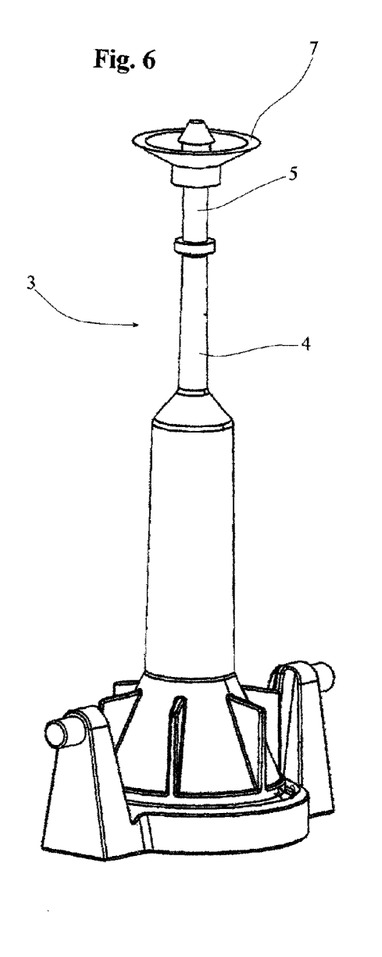
FIG. 6 shows a perspective view of just the valve body in one of the construction modes, two elements connected to each other.
Figure 7:
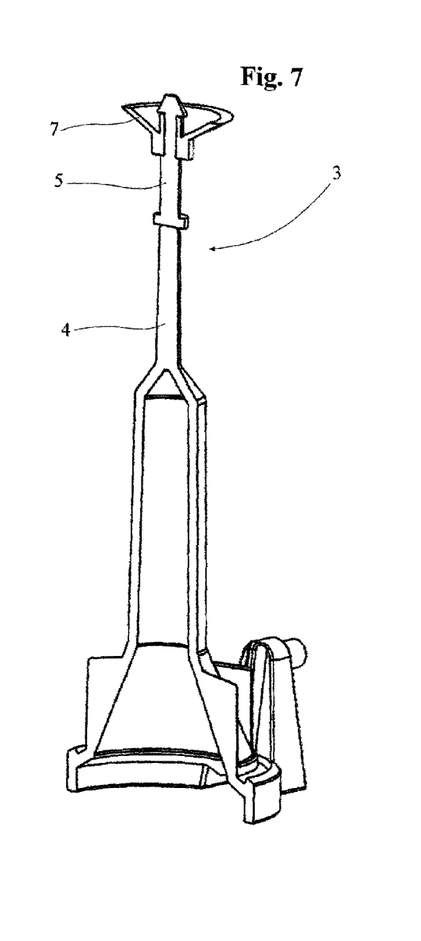
FIG. 7 shows a vertical cross-section view of only the valve body of FIG. 6
Figure 8:
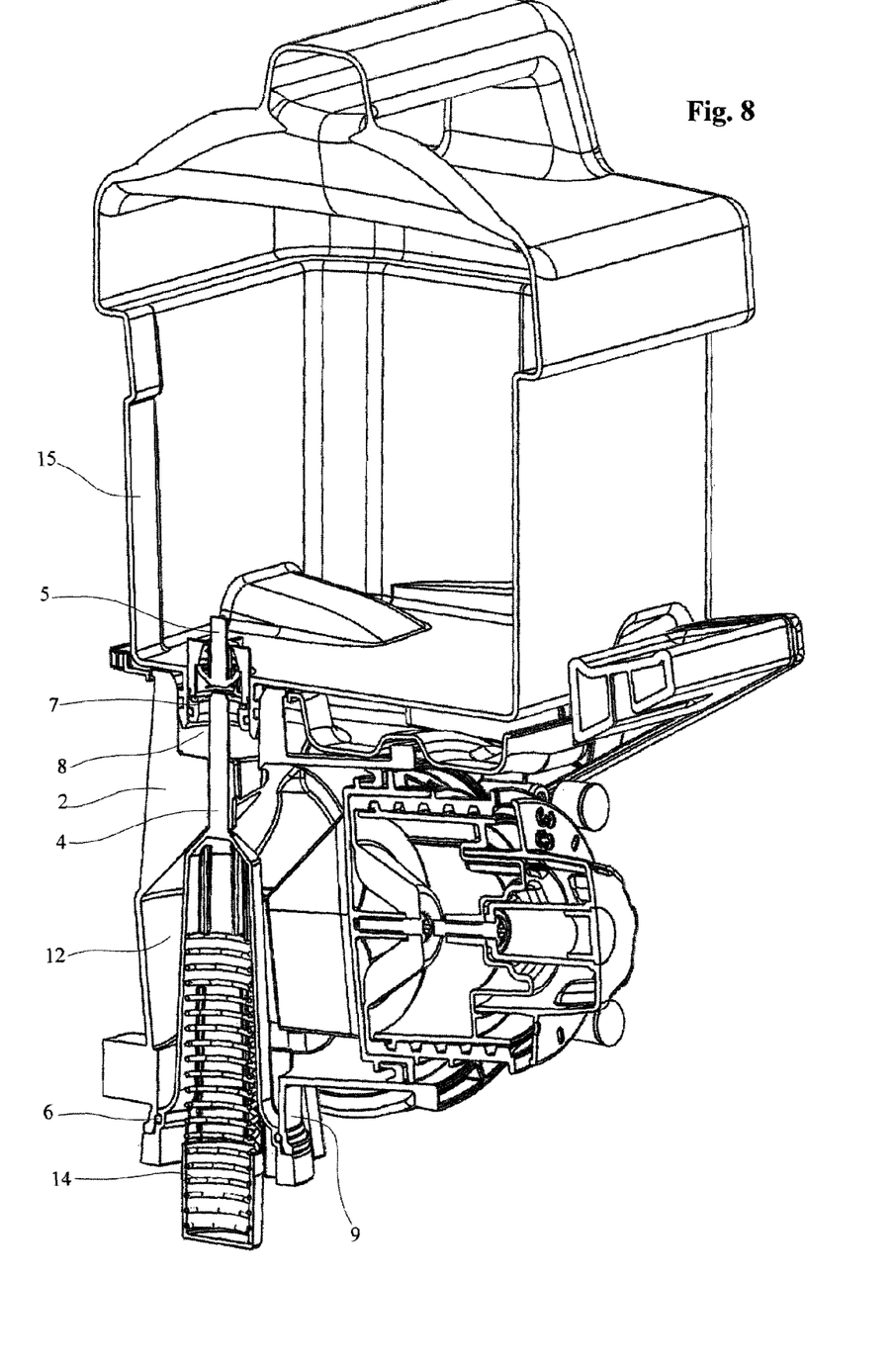
FIG. 8 shows a perspective and cross-section view of the dosing device equipped with a valve body in a different construction mode, with the two elements separated from one another.
Figure 9:
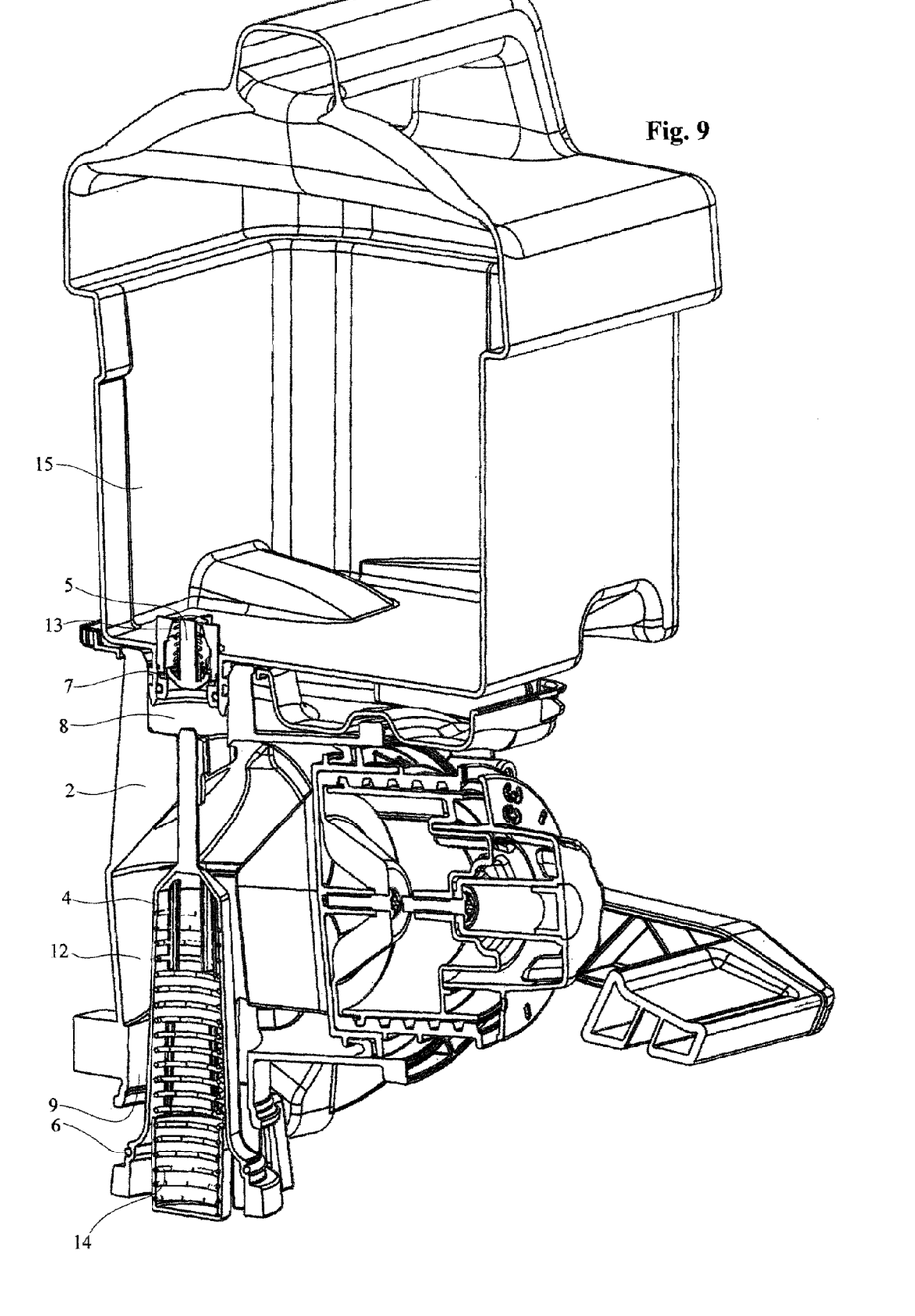
FIG. 9 shows the device of FIG. 8 with the first lower element of the valve body lowered and the outlet pipe open.
Figure 10:
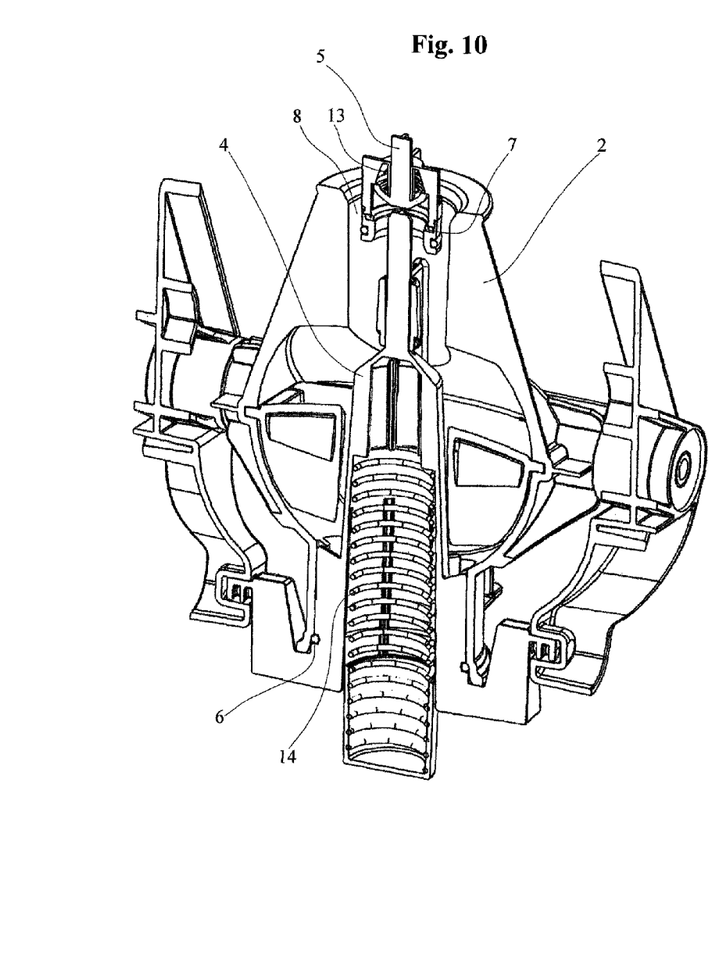
FIGS. 10 and 11 respectively show a vertical cross-section view the device of FIG. 8 and FIG. 9, but perpendicular with respect to the previous diagrams.
Figure 11:
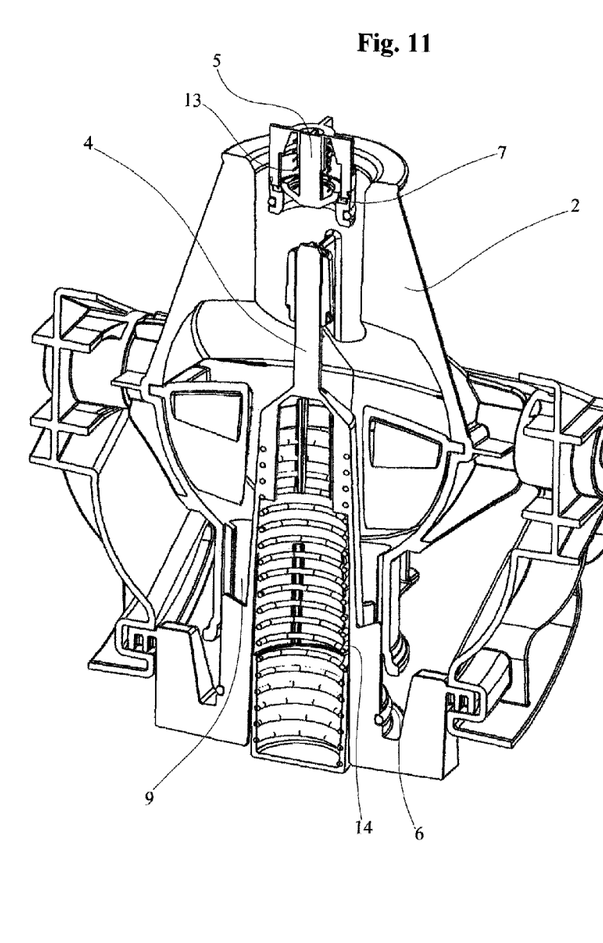
Figure 12:
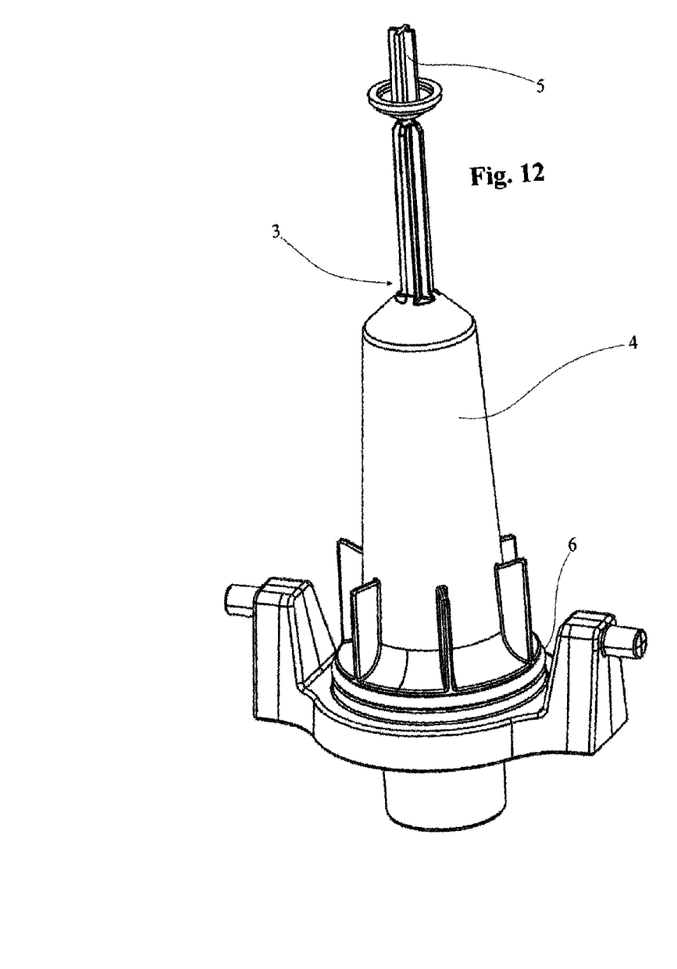
FIG. 12 shows a perspective view of only the valve body of FIGS. 8 to 11.
Figure 13:
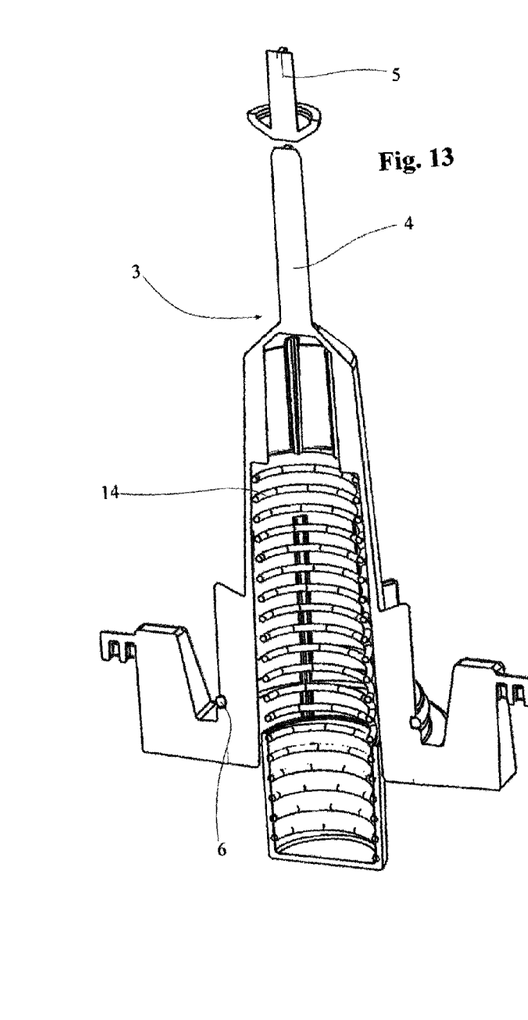
FIG. 13 shows a vertical cross-section view of only the valve body of FIG. 12.

On top of the dosing device 1 there is a tank 10 communicating hydraulically with the hollow body 2 beneath, from which is released the detergent stored in its dosage volume 12, into a soaking basin 11 underneath.

The inlet 8 and outlet 9 pipes of the hollow body 2 are opened and closed by a float valve 3 inside said hollow body 2.

In a first preferred and not limiting realisation of the valve body 3, it has two individual elements 4, 5 floating in the hollow body 2, with a possibility of their limited movement along its main axis.

The first element 4 of the valve body 3 is lower down and has a tubular configuration, preferably conical or truncated-conical; said first element 4 near the lower base has a hydraulic seal 6 for sealing the outlet pipe 9, or closing pipe, of the hollow body 2, in a first raised position explained above.

In this configuration, said first element 4, on the bottom, pushes with its top end the second element 5 of the valve body 3, on the top, and preferably with a single main axis between the two elements.

Following the push of the first element 4, the seal 7, which the second element 5 has, opens the inlet 8 of the hollow body 2 and hydraulically connects the inside of the tank 10, above the hollow body 2, with its dosing volume 12, and allowing it to fill with detergent that flows from the top tank 10.

In this situation, with the first element 4, the one lower than the valve body 3, which closes the outlet 9 of the dosing device 1 and with the second element 5, the one above the valve body, kept open, pulled aside from the high end of the lower element 4, the dosing device 1 is in a rest configuration, with the dosing volume chamber 12 filled with liquid detergent and communicating hydraulically with the inside of the tank 10 above.

Following a movement of the actuating devices, which act on the lower element 4 of the valve body 3, this latter shifts downwards in a sliding manner along its main axis, pulling the seal 6 with which it is equipped at the base away from the respective housing in the outlet pipe 9 of the hollow body 2, and opening the outlet of the dosing device 1.

Said opening of the outlet of the dosing device 1 makes the detergent in the dosing chamber 12 flow into the soaking basin 11 underneath to soak a cleaning cloth or mop.

With this shifting of the lower element 4, following a movement of the actuating devices, also the closing of the inlet 8 of the hollow body 2 starts, following the shifting from the raised rest position of the second element 5.

Said second element 5, usually kept pushed upwards by the upper part of the first element, positioned lower down, following the absence of a lower push, moves downwards with its seal 7 with which it is fitted, with the closing of the inlet 8 of the hollow body 2.

This closing of the inlet 8 prevents the hydraulic communication between the tank 10 and the hollow body 2, preventing the flow of the detergent from the tank 10 inside the dosing chamber 12 until the outlet 9 of the hollow body 2 is open.

The movement downwards of the second element 5, the one above the valve body 3, is possible after the pressure of the liquid detergent inside the tank 10, but can also occur through independent elastic device 13 that act directly on the upper element 5.

After the dosing chamber 12 has been completely emptied, these same actuating devices that previously moved towards the opening of the first element 4, or also other elastic devices 14 that act directly on said lower element 4, bring that first element 4 back to its rest condition, with the closure of the outlet 9 of the dosing device 1.

After the dosing chamber 12 has been empties, and the outlet pipe 9 of the seal 6 at the base of the first element 4 has re-closed, the filling cycle for the dosing chamber restarts with the shifting to an opening state of the inlet 8 of the upper element 5 of the valve body 3.

Advantageously dais first element 4, the one below the valve body 3, partially comes out from the hollow body 2 during the opening of the outlet 9.

In this state it is possible to evaluate the state of wear and intervene to eventually replace the seal 6 at the base of the lower element 4.

Moreover, with this shifting of the valve body 3, a visual evaluation and consequent maintenance work is possible, to clean and/or replacement, directly on the housing against which the lower seal 6 realises the hydraulic seal.

In fact it is very important that the lower part of the first element of the valve body is always exposed on the outside of the hollow body, and therefore able to connect to the closing profile of the outlet pipe on the outside of the hollow body.

The closing seal of the outlet pipe, which is compressed due to the hydraulic seal between the lower part of the first element of the valve body and the closing profile of the outlet pipe is therefore exposed during the moving away towards the outside of the lower part of the first element of the hollow body and made visible for an inspection.

Said sealing of the outlet pipe is on the closing edge of the outlet pipe, preferably on a specific housing of the lower part of the first element of the hollow body, but could also be on a specific housing of the valve body facing its outside.

With the above-mentioned configuration, the first element of the valve body can be easily removed from the valve body, without requiring any intervention, for example opening one of its parts or disassembling it.

This extraction of the first element of the valve body is therefore simple to carry out by pulling it through the outlet pipe of the valve body after eventually disconnecting the relative actuating devices and/or elastic devices that act on said first element of the valve body.

In this way the hollow body is simple to construct and easy to maintain, but above all the seals, at least the one of the outlet pipe is easy to replace, without having to, as in known devices of the prior art, disassemble the hollow body itself to access a valve body that is inside said hollow body and with the seals on the inside.

Another advantage is the fact that the thrust due to the closing action of the first element of the valve body, takes place by means of elastic devices on the outside of the hollow body.

Said push compresses the seal between the lower part of the first element of the valve body against the external profile of the outlet pipe, is a push of the first element of the valve body from outside the valve body.

In order to also easily work on the upper seal 7, designated to close the inlet 8, you necessarily have to pass through the inside of the tank 10.

It is clear that in the case where this is still full of detergent, this maintenance intervention is quite awkward.

Figure 14:
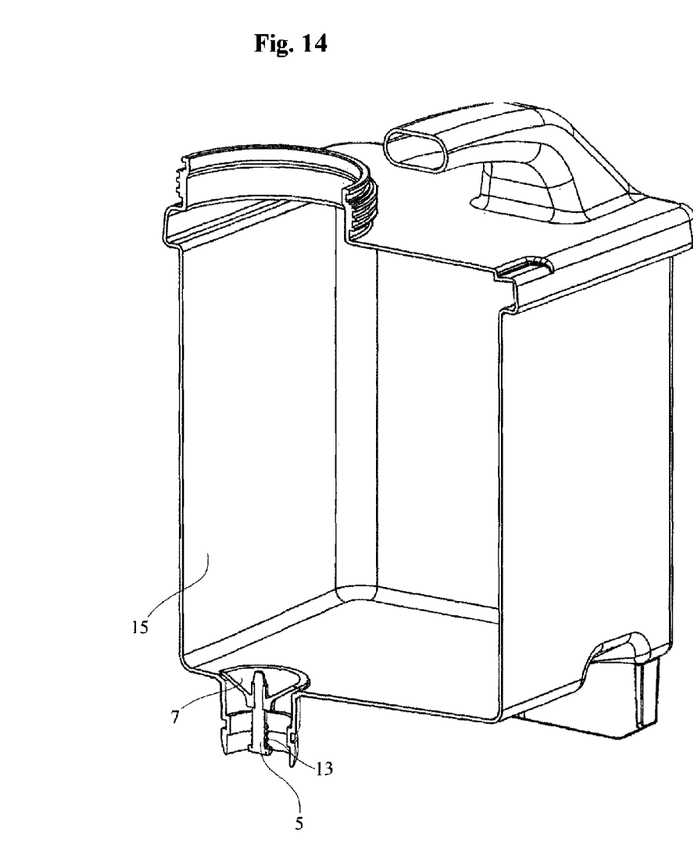
FIGS. 14 and 15 show the removable tank with the second upper element of the valve body on the bottom.
Figure 15:
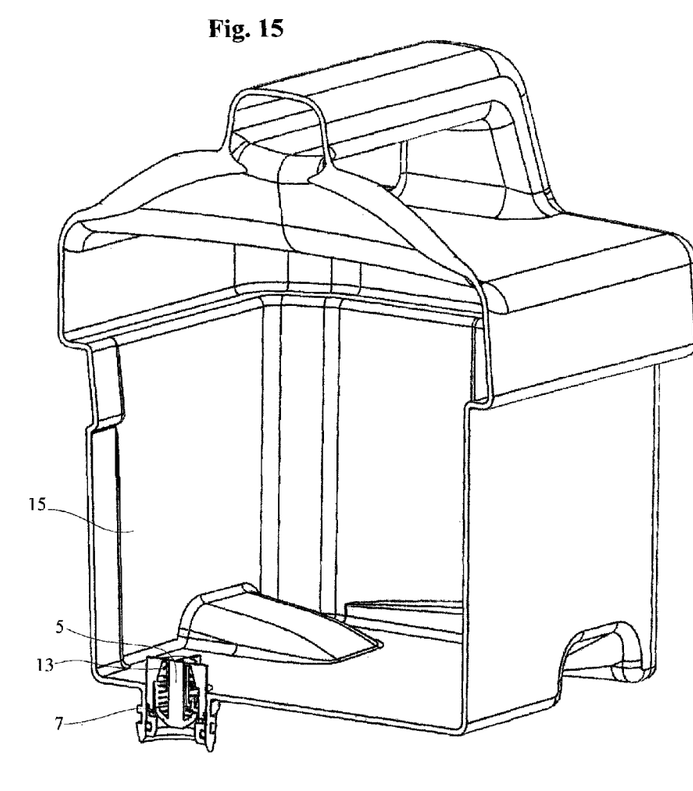

In an improved actuation method, shown as a second variant for actuating the invention, the tank 15 can be removed from the dosing device 1.

Advantageously, therefore, said tank 15 has its own valve 16 for closing its detergent outlet pipe 17, which moves, when opening and closing, just like the inlet valve of the hollow body 2; namely pushed from below upwards by the second element 5 underneath, the one above the valve body 3 for opening, and returns to a closed position following the pressure of the liquid detergent above or by means of the independent elastic devices 18.

This possibility of removing said tank 15 provides not only the user with a convenient way to carry out maintenance, because the upper element 5 of the valve body 3, and its seal 7, can be accessed directly, but this also allows you to easily replace the type of detergent for the cleaning you intend to carry out.

This simple replacement of the tank 15, without the need to empty a tank 10 fixed to the dosing unit 1, considerably simplifies the cleaning operations, facilitating the cleaning of each environment completely before moving on to the other operations.

Moreover, this availability of further tanks 15 with the exact dilution of the chemical concentrate, effectively prepared at the start of the cleaning operations, increases autonomy in cleaning operations, without any forced downtime.

For a simple and inexpensive realisation, the replacement of the second element 5, the one above the valve body 3, joined to the hollow body 2, can be provided for depending on the functions and location, with the closing valve 16 of the outlet pipe of the removable tank 15.

This valve 16 acts as and takes the place of the one fixed to the hollow body 2 when the removable tank 15 is installed above the dosing device 1, with its outlet pipe 17 above the inlet 8 of the hollow body 2, and is the independent closing element after the tank 15 of the dosing device 1 has been removed.

Clearly the maintenance of this valve 16, connected directly to the removable tank 15, can be easily carried out, both from above, through the inside of the tank 15 itself, and from below, since the valve 16 is practically exposed at the bottom on the outlet pipe 17 of the tank 15.

It can easily be understood that the installation phase of the tank 15 onto the dosing device 1 is carried out in a guided manner so that the valve 16 of the tank 15 and the part of the valve body 3 that can connect correctly to each other to correctly open the valve 16 of the tank 15 after the hydraulic seal has been realised between the outlet pipe 17 of the tank 15 and the inlet 8 of the hollow body 2.

In a second preferred and non-limiting actuation method for the valve body 3, it is two elements 4, 5 joined solidly to each other, in a floating manner with respect to the hollow body 2, with the possibility of their limited movement along its main axis.

Eventually said connection of the two elements 4 and 5 is adjustable in order to recuperate and regulate the reciprocal distance between the seals with respect to the dedicated housing on the inlet and outlet.

Advantageously this distance between the two seals for the inlet and the outlet is less than the distances of the closing sections of the inlet and outlet pipes of the hollow body, thereby guaranteeing the closing of a first pipe before the opening of the second pipe.

In this last method there is never any direct hydraulic communication between the tank 10 and the soaking basin 11, something that would cause the direct passage of the detergent through the hollow body 2.

The invention, conceived in this way, is susceptible to numerous modifications and variants, all falling within the ambit of the inventive concept; moreover, all the parts can be replaced by other technically equivalent components.

In practice, the materials used, as well as the dimensions and the contingent forms, can be whatever is required and according to the state of the art.

Where the characteristics and the technologies mentioned in any claim are followed by reference marks, these marks are there for the only purpose of making the claims more understandable and as a consequence these references in no way limit the interpretation of each element identified by way of example by these reference marks.

What is claimed is:

1. A valve body for a dosing device comprises a hollow body for storing and retaining a pre-determined amount of a cleaning liquid, the hollow body comprising a first valve body element and a second valve body element and adapted for insertion into a hollow body of the dosing device, the valve body adapted for an opening and closing of an inlet pipe and an outlet pipe, respectively, for supplying and emptying the cleaning fluid inside the hollow body, the valve body slidable upon operation of an actuation device of the dosing device between a first position with the inlet pipe open and the outlet pipe closed, and a second position with the inlet pipe closed and the outlet pipe open, the valve body having profiles proximate opposing ends thereof that join with cooperative inlet and outlet seals for closing the inlet and outlet pipes, a lower part of the first valve body element exposed on an outside of the hollow body and partially protruding from the hollow body upon opening of the outlet pipe, the outlet seal thereby being exposed.

2. The valve body of claim 1 wherein the outlet seal is, when closing, subject to the pressure from the lower part of the first valve body element that pushes from outside the hollow body.

3. The valve body of claim 1 wherein the outlet seal is on a closing edge of the outlet pipe.

4. The valve body of claim 1 wherein at least one of the valve body elements can be removed from inside of the hollow body through the outlet pipe for maintenance or replacement.

5. The valve body of claim 1 wherein the valve body and an upper element are mutually connected.

6. The valve body of claim 5 wherein the lower part of a first valve body and the upper element of the valve body are joined together in an adjustable manner.

7. The valve body of claim 1 wherein one of the seals is solidly connected to an upper element and/or the lower part of a first valve body, remaining exposed and protruding in either the first or second position of the valve body.

8. The valve body of claim 1 wherein one of the seals is solidly connected to a mouth opening of the inlet pipe and/or the outlet pipe, the one of the seals being retained within a specific housing.

9. The valve body of claim 1 wherein the lower part of a first valve body is urged into its closed position by at least one elastic device that acts on a part outside of the hollow body of the lower part of the first valve body.

10. The valve body of claim 1 wherein an upper element of the valve body is urged into its closed position by at least one elastic device that acts on the upper element of the valve body.

11. The valve body of claim 1 wherein the first valve body element and the second valve body element are axially overlapping.

12. The valve body of claim 1 wherein the second valve body element is connected to a removable tank above the hollow body of the dosing device.

* * * * *